(12) United States Patent
Ungermann

(10) Patent No.: US 8,825,251 B2
(45) Date of Patent: Sep. 2, 2014

(54) DEVICE FOR PERFORMING ENERGY MANAGEMENT IN AN ELECTRIC VEHICLE

(75) Inventor: Jochen Ungermann, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/698,551

(22) PCT Filed: Apr. 21, 2011

(86) PCT No.: PCT/EP2011/002062
§ 371 (c)(1),
(2), (4) Date: Nov. 16, 2012

(87) PCT Pub. No.: WO2011/144291
PCT Pub. Date: Nov. 24, 2011

(65) Prior Publication Data
US 2013/0073132 A1 Mar. 21, 2013

(30) Foreign Application Priority Data
May 19, 2010 (DE) .......................... 10 2010 021 031

(51) Int. Cl.
*B60L 11/00* (2006.01)

(52) U.S. Cl.
USPC .................. 701/22; 701/99; 702/63; 74/329; 320/109; 320/130; 320/150; 340/425.5; 340/450.2; 307/10.1; 60/300; 123/559.3; 180/65.29

(58) Field of Classification Search
USPC ........... 701/22, 99; 702/63; 74/329; 320/109, 320/130, 150; 340/425.5, 450.2; 307/10.1; 60/300; 123/559.3; 180/65.29
See application file for complete search history.

(56) References Cited

U.S. PATENT DOCUMENTS

| 6,006,151 | A | 12/1999 | Graf |
| 6,553,301 | B1 | 4/2003 | Chhaya et al. |
| 6,588,256 | B2 | 7/2003 | Gassner et al. |
| 2002/0033059 | A1* | 3/2002 | Pels et al. ........................ 74/329 |
| 2003/0117113 | A1* | 6/2003 | Takemasa et al. ............ 320/150 |
| 2003/0140905 | A1* | 7/2003 | Nau et al. .................... 123/559.3 |
| 2005/0034451 | A1* | 2/2005 | Miyashita ........................ 60/300 |
| 2007/0075686 | A1* | 4/2007 | Togashi et al. ................. 320/130 |
| 2008/0040016 | A1* | 2/2008 | Fujishiro .......................... 701/99 |
| 2008/0162059 | A1* | 7/2008 | Murakami ........................ 702/63 |
| 2009/0114463 | A1* | 5/2009 | DeVault ..................... 180/65.29 |
| 2009/0271132 | A1* | 10/2009 | Furukawa et al. ............... 702/63 |
| 2010/0108415 | A1 | 5/2010 | Tuli |
| 2010/0238006 | A1* | 9/2010 | Grider et al. ............... 340/425.5 |
| 2010/0289451 | A1* | 11/2010 | Tuffner et al. ................. 320/109 |

(Continued)

FOREIGN PATENT DOCUMENTS

| DE | 10038181 A1 | 3/2002 |
| DE | 10318882 A1 | 11/2004 |

(Continued)

*Primary Examiner* — James Trammell
*Assistant Examiner* — Sanjeev Malhotra
(74) *Attorney, Agent, or Firm* — Henry M Feiereisen LLC

(57) ABSTRACT

A device for performing energy management in an electric vehicle which can be driven at least partially by an electric machine which can be supplied with electrical energy by a rechargeable battery, wherein the state of charge (SOC) of the rechargeable battery varies during charging and discharging, includes a driver-type recognition device for determining the driver-type (I, II). The driver-type recognition device monitors the discharge process of the rechargeable battery during driving and recognizes the driver-type (I, II) therefrom.

10 Claims, 3 Drawing Sheets

(56) References Cited

U.S. PATENT DOCUMENTS

| | | | |
|---|---|---|---|
| 2011/0012424 A1* | 1/2011 | Wortberg et al. | 307/10.1 |
| 2012/0101674 A1* | 4/2012 | Wang et al. | 701/22 |
| 2012/0242466 A1* | 9/2012 | Stillfried et al. | 340/425.5 |
| 2012/0319833 A1* | 12/2012 | Fokkelman et al. | 340/450.2 |

FOREIGN PATENT DOCUMENTS

| | | |
|---|---|---|
| DE | 102004023505 A1 | 12/2005 |
| DE | 102004023512 A1 | 12/2005 |
| DE | 102006050096 A1 | 11/2007 |
| DE | 102007024471 A1 | 11/2008 |

* cited by examiner

DEVICE FOR PERFORMING ENERGY MANAGEMENT IN AN ELECTRIC VEHICLE

CROSS REFERENCES TO RELATED APPLICATIONS

This application is the U.S. National Stage of International Application No. PCT/EP2011/002,062, filed Apr. 21, 2011, which designated the United States and has been published as International Publication No. WO 2011/144,291 and which claims the priority of German Patent Application, Serial No. 10 2010 021 031.5, filed May 19, 2010, pursuant to 35 U.S.C. 119(a)-(d).

BACKGROUND OF THE INVENTION

The invention relates to a device for energy management in an electric vehicle and to a method for energy management in an electric vehicle.

In a vehicle-type-dependent control of a motor vehicle, in particular the dynamic driving characteristic of the vehicle can be adapted to an economical or a sporty driving style of the driver. Information about the specific driver-type is required to enable the control system to set the appropriate operating parameters.

DE 10 2004 023 512 A1 discloses a generic electric vehicle with a device for energy management. The vehicle has at least one electric machine for driving the vehicle wheels. The electric machine is supplied with electrical energy from an energy storage device, wherein the state of charge of the energy storage device varies during charging and discharging. Moreover, the vehicle control includes driver-type recognition capable of detecting a sporty driver or an economical driver.

The driver-type recognition can be derived from the operation of the accelerator pedal during driving. For this purpose, the angular positions as well as the rate of change upon actuation of the accelerator pedal can be detected. Alternatively or in addition, information about the driver-type may also be derived from the operation of a manual transmission. Measurements of these parameters require extensive sensor-related technical measures which are also associated with a substantial component expenditure.

SUMMARY OF THE INVENTION

The object of the invention is to provide a device or a method for energy management in an electric vehicle, which enables a simple and reliable detection of the driver-type.

According an aspect of the invention, a device for performing energy management in an electric vehicle, which can be at least partially driven by an electrical machine which can be supplied with electrical power from a rechargeable battery, wherein the state of charge (SOC) of the rechargeable battery varies during charging and discharging, includes a driver-type recognition device for determining a driver-type. The driver-type recognition device monitors during a driving operation the discharge process of the energy storage device, i.e. the high-voltage battery supplying power to the electric machine, and determines therefrom the driver-type. Upon detection of an accelerated discharge process, a sporty driver-type can thus be determined. Conversely, upon detection of a delayed discharge process, an economic driver-type can be determined.

The invention is therefore based on the observation that the course of the discharge process during a driving interval allows conclusions about the manner in which the driver demands power. Because the power electronics of the energy storage device monitors charge and also discharge process of the energy storage device anyway, the recognition of the driver-type according to the invention can be implemented with little expenditure and does not require the installation of additional sensor elements.

For monitoring the discharge process, the driver-type recognition device may include a measuring device. This measuring device may preferably measure the temporal course of the state of charge of the energy storage device or measurement values correlating therewith, for example the current or the voltage of the energy storage device. Such measuring devices may already be integrated into the power electronics of the energy storage device, so that the existing measuring devices instruments may be used according to the invention in a dual function also for recognizing the driver-type.

To obtain a measure of the vehicle power demanded by driver over a certain time span, the recognition device may detect the state of charge at the beginning of a driving interval and the state of charge at the end of the driving interval and determine therefrom a difference value. The driver-type can be derived from the difference value with an evaluation device receiving signal from the recognition device.

Preferably, the recognition device may determine from the difference value a gradient over the driving interval. This gradient may be compared in the evaluation device with a threshold value stored therein, wherein the evaluation device can detect the driver-type based on the comparison. The evaluation device is also in signal communication with a central electronic control device of the motor vehicle. Subsequent to the identification of the driver-type, a corresponding driver-type signal is then transmitted to the control device. The control device can then adapt, in particular, the dynamic behavior of the vehicle commensurate with the driver-type signal.

The state of charge of the energy storage can be measured in its power electronics by measuring the current flowing out of the energy storage device upon a power demand from the driver, which is then integrated over time. Alternatively and/or in addition, the aforementioned evaluation device may also measure the discharge process of the energy storage device in a different manner and compare the discharge process with corresponding stored threshold values, and recognize the driver-type based on the comparison.

For example, alternatively or in addition to measuring the state of charge, the temporal course of the voltage of the energy storage device, which correlates with the state of charge of the energy storage device, may also be measured, wherein the temporal characteristic of the state of charge is significantly more sluggish than the temporal characteristic of the voltage of the energy storage device during the driving operation. When monitoring the discharge process based on the temporal characteristic of the voltage, a particular phenomenon occurs wherein short-term voltage drops in the energy storage device occur in response to high power demands from the driver. These voltage drops are reproduced in the temporal characteristic of the voltage of the energy storage device, but not in the much more sluggish temporal characteristic of the state of charge of the energy storage device. The voltage drops can be used according to the invention for recognizing the driver-type. The evaluation device may compare the voltage drops occurring during the driving interval with respect to gradient, magnitude, duration and/or number and compare them with threshold values stored in the evaluation device.

By way of example, different profiles of driver-types may be stored in the evaluation device, each containing different threshold values for the gradient, the magnitude, the duration and/or the number of voltage drops. Upon a match with one of these profiles, the evaluation device may forward a corresponding driver-type signal to the central electronic control device.

BRIEF DESCRIPTION OF THE DRAWING

Two exemplary embodiments of the invention will now be described with reference to the appended figures, which show in.

DETAILED DESCRIPTION OF PREFERRED EMBODIMENTS

Figure 1:
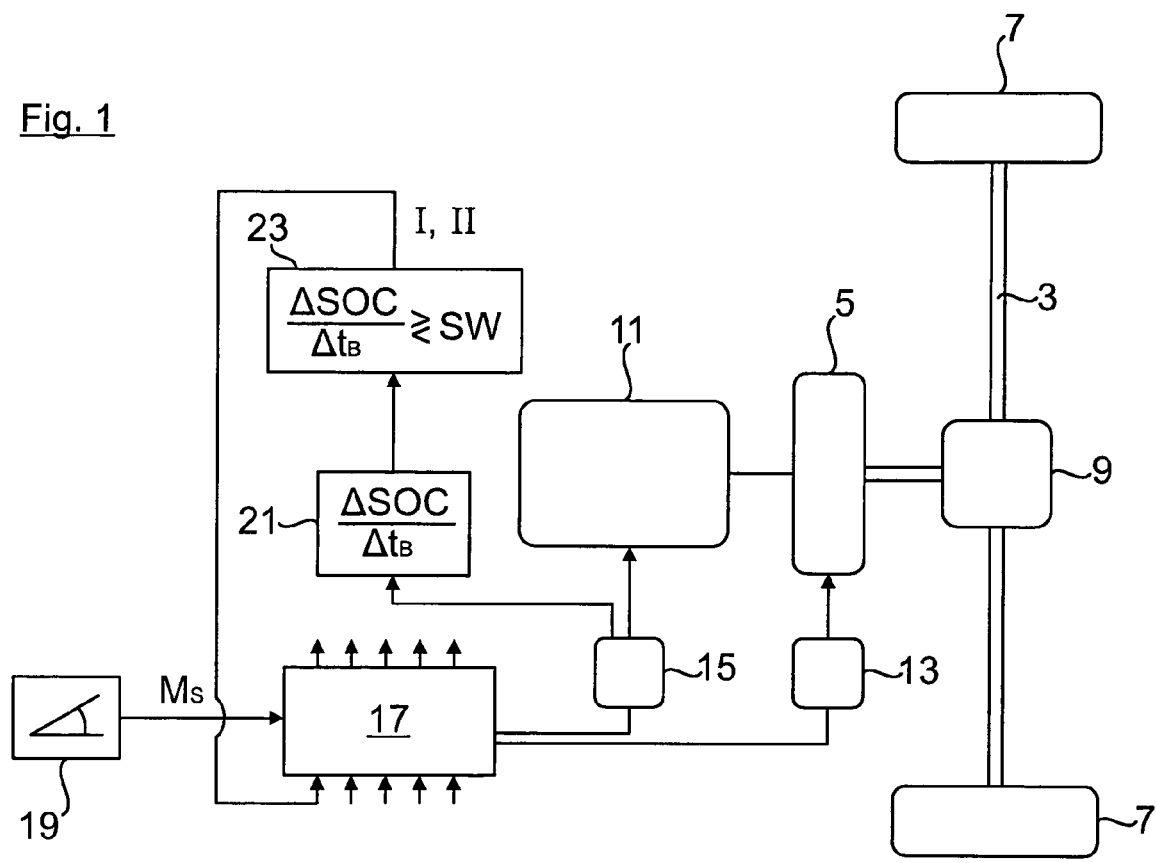
FIG. 1 a schematic diagram of a drive system of an electric vehicle.

FIG. 1 shows in a schematic diagram the drive system of an electric vehicle, which is driven by way of example only at a single vehicle axle 3. An electric machine 5 is connected at the vehicle axle 3 to a drive train, which drives the two wheels 7 of the vehicle via an axle differential 9. The electric machine 5 is electrically connected with a high-voltage battery 11 as an energy storage device, which depending on the driving conditions is discharged for supplying power to the electric machine 5 or is charged in a recuperation mode by the electric machine 5 which then operates as a generator. The additional drive components, such as the power electronics 13 of the electric machine 5 or the battery control device 15 are only roughly sketched in FIG. 1 without further description for sake of clarity.

A central electronic control device 17 is provided for controlling the high-voltage battery 11 and the electric machine 5. The control device 17 detects via a pedal module 19 changes made to the accelerator pedal angle by the driver. Additionally, the control device 17 detects as input parameters, inter alia, available battery power, the efficiency characteristic curve fields of the electric machine, ambient and/or aggregate temperatures, driving dynamics limits, load points of the electric machine 5 as well as the vehicle speed, the engaged gear and the like.

Based on these input variables, the control device 17 calculates a desired torque $M_S$ with which the engine control device 13 is controlled.

The battery control device 15 of the high-voltage battery 11 is equipped with measuring devices (not shown in detail) configured to monitor a discharge process or the charge process of the high-voltage battery 11. For this purpose, the current flowing out to the electric machine 5, the battery voltage or the state of charge SOC can be monitored with the battery control device 15.

According to the invention, the battery control device 15 is part of a driver-type recognition device, with which the central electronic control device 17 can adapt the dynamic driving characteristic of the vehicle to the respective driver. To this end, the discharge process of the energy storage device 11 is monitored during driving and is then used as a measure for the power of the vehicle demanded by the driver over a certain time span.

Figure 2:
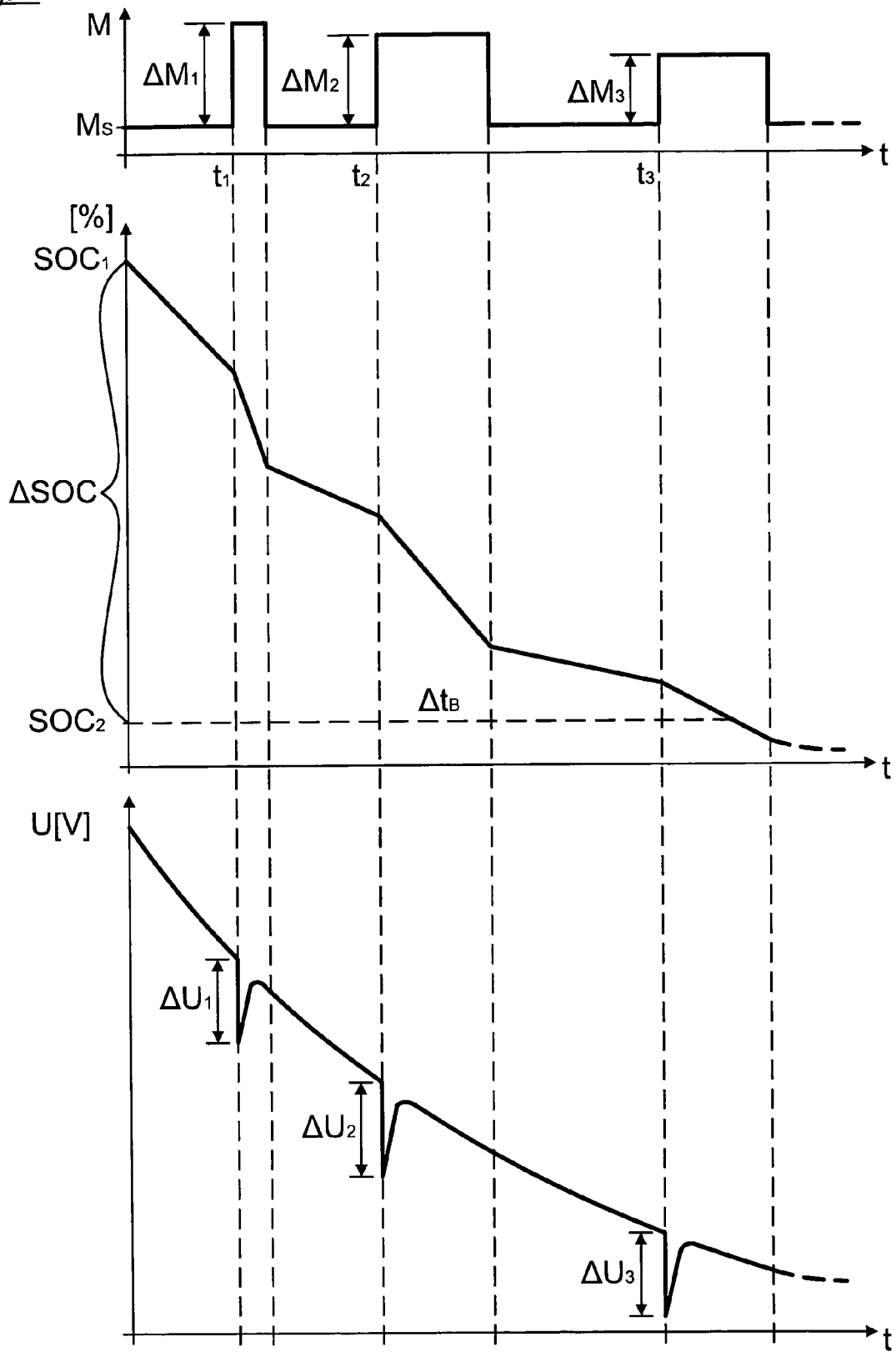
FIG. 2 temporal diagrams of a torque demand from a driver, the state of charge of the vehicle battery, and the battery voltage during a driving operation.

FIG. 2 shows three temporal diagrams illustrating an exemplary discharge process of the energy storage device 11 during a driving interval $t_B$. The discharge process is derived here from an exemplary desired torque $M_S$ set by the pedal module 19. The desired torque $M_S$ is in certain driving situations, for example when passing, briefly and abruptly increased at the times $t_1$, $t_2$ and $t_3$ by difference values $\Delta M_1$, $\Delta M_2$ and $\Delta M_3$. The resulting discharge process of the high-voltage battery 11 is illustrated in the temporal diagrams arranged underneath, which show the temporal course of the battery state of charge SOC and of the battery voltage U. As can be seen, both the SOC curve and the voltage curve decrease steadily during vehicle operating interval $t_B$. During the abrupt increases $\Delta M_1$, $\Delta M_2$ and $\Delta M_3$ of the desired torque, the high-voltage battery 11 responds with an increased reduction of the battery-charge SOC. The curve of the state of charge shown in FIG. 2 therefore decreases in the region of the abrupt increases $\Delta M_1$, $\Delta M_2$ and $\Delta M_3$ with a larger gradient. Commensurately, the high-voltage battery 11 responds to the increased torque demands from the driver with brief voltage drops $\Delta U_1$, $\Delta U_2$ and $\Delta U_3$, which are reflected in the temporal course of the battery voltage U.

According to the first exemplary embodiment illustrated in FIG. 1, the vehicle-type recognition device includes a recognition device 21 and an evaluation device 23 connected downstream in the direction of signal flow. The detection device 21 detects a first state of charge $SOC_1$ at the beginning of the driving interval $\Delta t_B$ and a second state of charge $SOC_2$ at the end of the driving interval $\Delta t_B$ and determines therefrom a difference value $\Delta SOC$. The detection device 21 then determines from this difference value a gradient $\Delta SOC/\Delta t_B$. This gradient is compared in the evaluation device 23 with a stored threshold value. Based on this comparison, the evaluation device 23 determines a driver-type I with a sporty driving style or a driver-type II with an economical driving style. The evaluation device 23 subsequently transmits a corresponding driver-type signal I or II to the central electronic control device 17.

Figure 3:
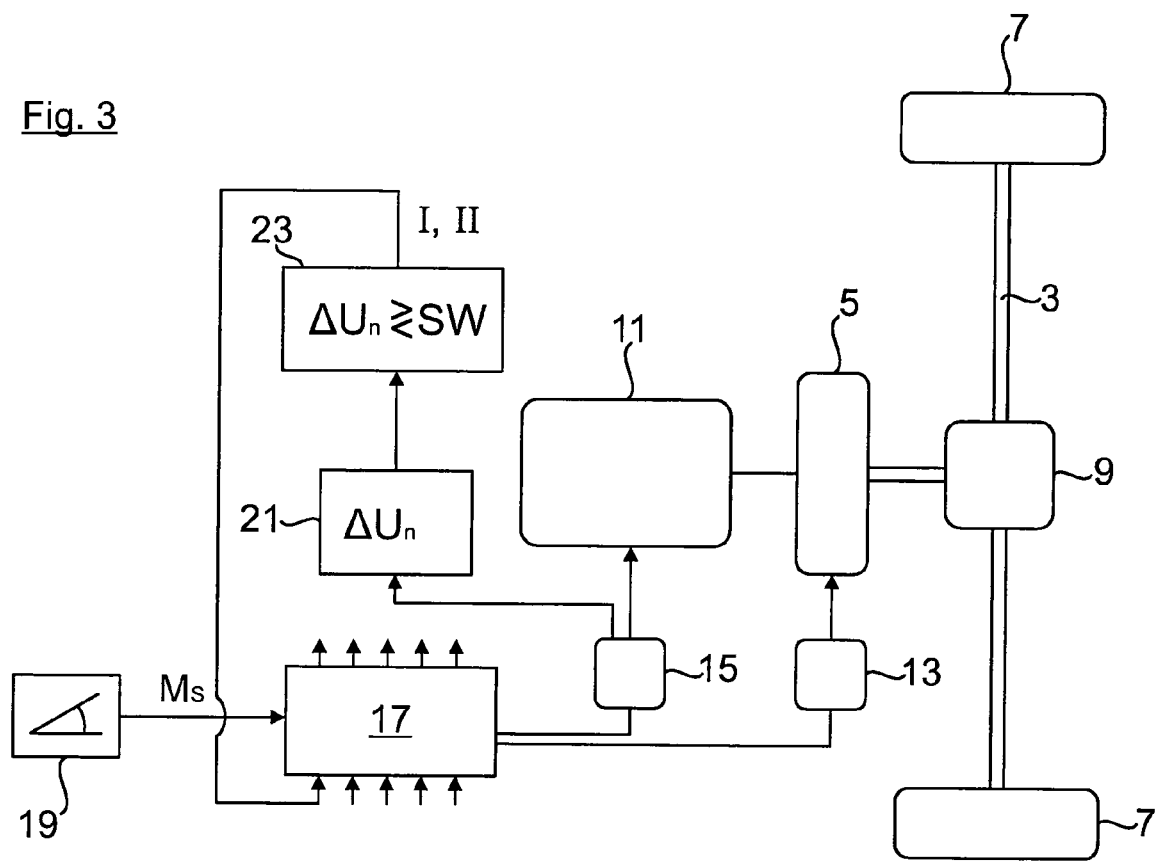
FIG. 3 a drive system according to the second exemplary embodiment.

FIG. 3 shows a driver-type recognition device according to the second exemplary embodiment. The basic design of the vehicle drive system is identical to that of FIG. 1. In contrast to FIG. 1, however, the temporal course of the high-voltage battery voltage U is measured for monitoring the discharge process. The detection device 21 detects the brief voltage drops $\Delta U_1$, $\Delta U_2$ and $\Delta U_3$ and measures their magnitude, their duration and/or their number n. The voltage drops $\Delta U_1$, $\Delta U_2$ and $\Delta U_3$ are subsequently compared in the evaluation device 23 with driver-type profiles I and II, with threshold values typical for a sporty driver or for an economical driver being stored in each of the profiles I and II. Based on this comparison, the evaluation device 23 generates a driver-type signal I, II that is forwarded to the central electronic control device 17.

What is claimed is:

1. A device for performing energy management in an electric vehicle, wherein the electric vehicle comprises an electric machine for at least partially driving the vehicle and a rechargeable battery supplying electrical power to the electrical machine, the device comprising:

a measuring device configured to measure a temporal course of a state of charge (SOC) of the rechargeable battery, wherein the state of charge (SOC) of the rechargeable battery varies during a charge process and a discharge process and is correlated with the battery voltage, the measuring device measuring at least one of a magnitude, a duration and a number of brief voltage drops occurring in the temporal course of the battery voltage during the discharge process of the rechargeable battery as a result of high power demands from a driver during a driving interval;

an evaluation device comparing the at least one magnitude, duration and number of the voltage drops measured by the measuring device with threshold values stored in the evaluation device; and a driver-type recognition device determining a driver-type based on the comparison.

2. The device of claim 1, wherein the measuring device measures the state of charge both at a beginning of the driving interval and at an end of the driving interval and determines therefrom a difference value.

3. The device of claim 2, wherein the measuring device determines from the difference value a gradient of the difference value over the driving interval.

4. The device of claim 1, wherein the evaluation device compares the discharge process of the rechargeable battery with threshold values stored in the evaluation device and determines the driver-type based on the comparison.

5. The device of claim 4, wherein the evaluation device compares an actual gradient of a difference value between a state of charge both at a beginning of the driving interval and at an end of the driving interval over the driving interval as determined by the measuring device with a threshold value.

6. A method for performing energy management in an electric vehicle, wherein the electric vehicle comprises an electric machine for at least partially driving the vehicle and a rechargeable battery supplying electrical power to the electrical machine, the method comprising the steps of:

monitoring a discharge process of the rechargeable battery during a driving operation;

measuring a temporal course of a state of charge (SOC) of the rechargeable battery, wherein the state of charge (SOC) of the rechargeable battery varies during a charge process and the discharge process and is correlated with the battery voltage;

measuring at least one of a magnitude, a duration and a number of brief voltage drops in the temporal course of the battery voltage during a driving interval as a result of high power demands from a driver;

comparing the at least one magnitude ratio and number of the voltage drops with stored threshold values; and determining by an evaluation device a driver-type based on the comparison.

7. The method of claim 6, further comprising:

measuring the state of charge both at a beginning of the driving interval and at an end of the driving interval and determining therefrom a difference value.

8. The method of claim 7, further comprising:

determining from the difference value a gradient of the difference value over the driving interval.

9. The method of claim 6, further comprising:

comparing the discharge process of the rechargeable battery with stored threshold values, and determining the driver-type based on the comparison.

10. The method of claim 9, further comprising:

comparing an actual gradient of a difference value between a state of charge both at a beginning of the driving interval and at an end of the driving interval over the driving interval with a threshold value.

* * * * *

UNITED STATES PATENT AND TRADEMARK OFFICE
CERTIFICATE OF CORRECTION

PATENT NO. : 8,825,251 B2  Page 1 of 1
APPLICATION NO. : 13/698551
DATED : September 2, 2014
INVENTOR(S) : Jochen Ungermann It is certified that error appears in the above-identified patent and that said Letters Patent is hereby corrected as shown below:

In the Claims

Column 6, in claim 6, line 10 "magnitude ratio" should be --magnitude duration--.

Signed and Sealed this
Twenty-seventh Day of January, 2015

Michelle K. Lee
*Deputy Director of the United States Patent and Trademark Office*